United States Patent [19]

Ohnishi et al.

[11] Patent Number: 5,220,594
[45] Date of Patent: Jun. 15, 1993

[54] CORDLESS TELEPHONE SYSTEM HAVING A TELEPHONE ANSWERING MACHINE FUNCTION

[75] Inventors: Kanji Ohnishi; Masato Yamagata, both of Kanagawa, Japan

[73] Assignee: Sony Corporation, Tokyo, Japan

[21] Appl. No.: 656,685

[22] Filed: Feb. 19, 1991

[30] Foreign Application Priority Data

Feb. 23, 1990 [JP] Japan .................................. 2-043826

[51] Int. Cl.⁵ ............................................ H04M 11/10
[52] U.S. Cl. ........................................ 379/61; 379/63; 379/67
[58] Field of Search .................. 379/61, 58, 59, 67, 379/88, 63

[56] References Cited

U.S. PATENT DOCUMENTS 4,941,203  7/1990  Patsiokas et al. .................. 379/67 X
5,073,928 12/1991  Shimanuki ........................... 379/67

Primary Examiner—Curtis Kuntz
Assistant Examiner—George J. Oehling
Attorney, Agent, or Firm—William S. Frommer; Alvin Sinderbrand

[57] ABSTRACT

A cordless telephone is comprised of a base unit, a handset unit, and a telephone answering machine (TAM) unit. In a normal communication mode, audio signals from the handset unit are coupled to the telephone line network through the base unit. In an automatic answering mode, an audio signal from the telephone line network is recorded at the TAM unit through the base unit. When a predetermined key of the handset unit is operated, a control signal is supplied to the TAM unit by way of a transmitting circuit in the handset unit, a receiving circuit in the base unit, a transmitting circuit in the base unit and a receiving circuit of the TAM unit to place the TAM unit in a reproduction mode, whereby previously recorded audio signals are reproduced and supplied to the handset unit via a transmitting circuit in the TAM unit, the receiving circuit in the base unit, the transmitting circuit in the base unit and a receiving circuit in the handset unit.

8 Claims, 12 Drawing Sheets

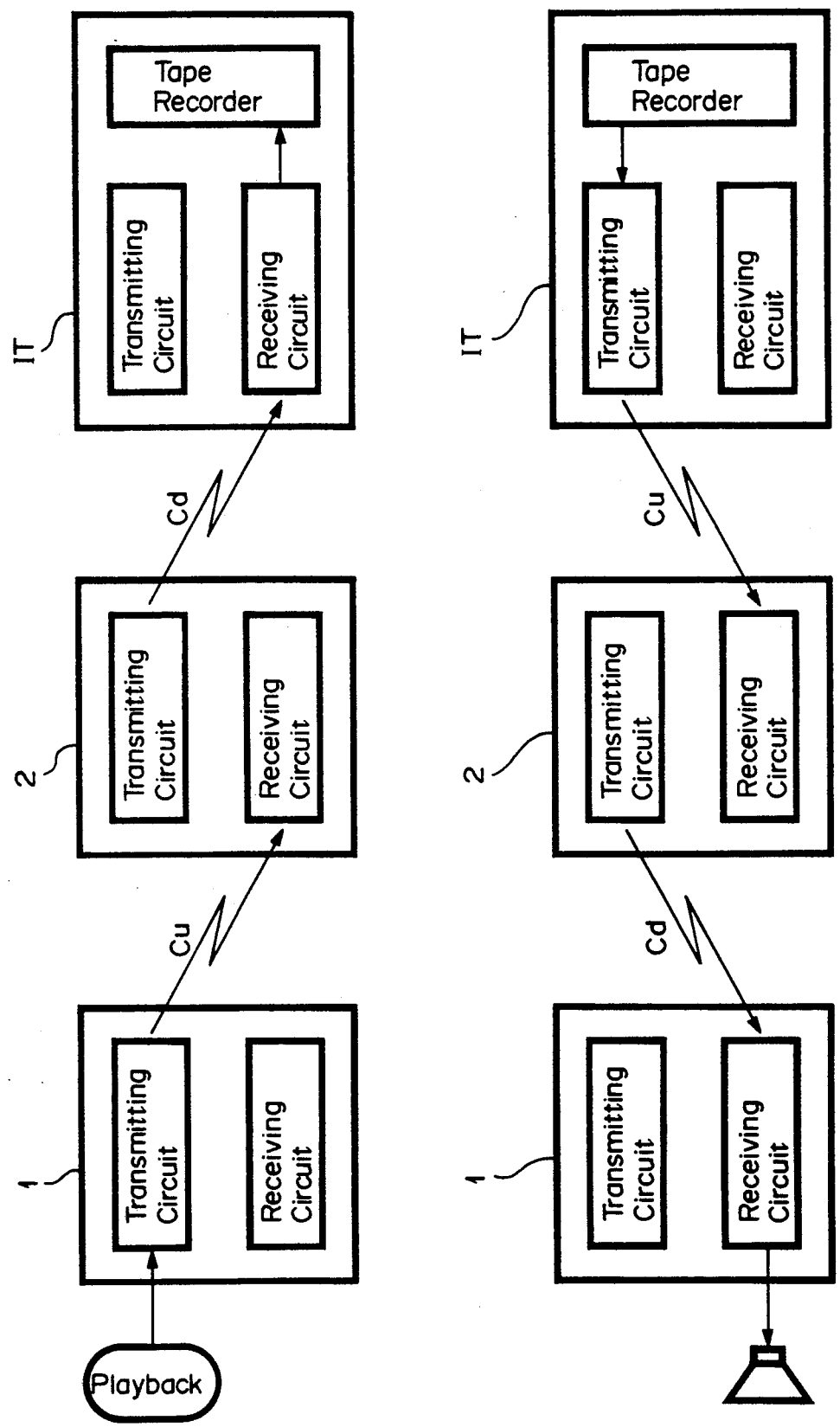

CORDLESS TELEPHONE SYSTEM HAVING A TELEPHONE ANSWERING MACHINE FUNCTION

BACKGROUND OF THE INVENTION

1. Field of the Invention

The present invention relates generally to cordless telephones and, more particularly, to a cordless telephone system having an automatic telephone answering machine function.

2. Description of the Prior Art

It has been known to combine a cordless telephone with a telephone answering machine (hereinafter simply referred to as a TAM) thereby providing a cordless telephone system having an automatic response telephone function or an automatic answering telephone function, such as represented by systems shown in FIGS. 1A and 1B. The system of FIG. 1A is comprised of handset units 1A–1C (remote stations), a base unit 2 (master station) and a telephone line network 3 (outside line). Handset units 1A, 1B and 1C are the same as those of an ordinary cordless telephone while base unit 2 has a TAM function. This base unit houses a tape recorder to reproduce an outgoing message (hereinafter referred to as an answering message), which is played back to a calling party when an incoming call is received, and to record an incoming message (hereinafter referred to as a business message) spoken by the calling party.

In the system shown in FIG. 1B, the handset units 1A, 1B and the base unit 2 are the same as those of an ordinary cordless telephone while the handset unit 1C has the TAM function. Accordingly, the handset unit 1C houses a tape recorder for recording and reproducing an answering message and a business message.

In the above-mentioned conventional cordless telephone systems shown in FIGS. 1A and 1B, in order to hear the recorded business message, the user must be located physically at the base unit 2 or at the handset unit 1C having the TAM function and push an operation button thereof (such as a START button). This detracts from many of the advantages of a cordless telephone.

OBJECTS AND SUMMARY OF THE INVENTION

Accordingly, it is an object of the present invention to provide an improved cordless telephone having an automatic answering function which avoids the aforenoted shortcomings and disadvantages of the prior art.

More specifically, it is an object of the present invention to provide a cordless telephone having an automatic answering function in which the advantages of a cordless telephone system are not lost.

It is another object of the present invention to provide a cordless telephone having an automatic answering function which does not require a special transmitting circuit or a special receiving circuit for the telephone answering function and, therefore, the cordless telephone system can be readily utilized even when the number of transmitting channels are restricted by regulations.

It is still another object of the present invention to provide a cordless telephone system having an automatic answering function by using a telephone answering machine unit.

It is a further object of the present invention to provide a cordless telephone system useable with a telephone answering machine unit that can be freely located within the service area of the cordless telephone base unit.

In accordance with an aspect of the present invention, a cordless telephone system is comprised of a base unit having a transmitting circuit and a receiving circuit connected as a pair to a telephone line network, a handset unit having a microphone and a speaker for carrying on a telephone conversation as well as a transmitting circuit and a receiving circuit, and a telephone answering machine (TAM) unit having audio signal recording and reproducing apparatus and a transmitting circuit and a receiving circuit. In a normal communication mode, audio signals from the microphone are coupled to the telephone line network through the transmitting circuit of the handset unit and the receiving circuit of the base unit. Similarly, audio signals from the telephone line network are transmitted from the transmitting circuit of the base unit to the receiving circuit of the handset unit and thence to the speaker. In an automatic answering mode, an audio signal from the telephone line network is recorded on the recording apparatus through the transmitting circuit of the base unit and the receiving circuit of the TAM unit. When a predetermined key of the handset unit is operated, a control signal indicative of such key operation is supplied from the transmitting circuit of the handset unit, the receiving circuit of the base unit, the transmitting circuit of the base unit and the receiving circuit of the TAM unit to place the reproducing apparatus in a reproduction mode such that the audio signal that had been recorded previously is reproduced by the reproducing apparatus and supplied to the speaker via the transmitting circuit of the TAM unit, the receiving circuit of the base unit, the transmitting circuit of the base unit and the receiving circuit of the handset unit.

The above, and other objects, features and advantages of the present invention will become apparent from the following detailed description of illustrative embodiments thereof to be read in conjunction with the accompanying drawings, in which like reference numerals are used to identify the same or similar parts in the several views.

BRIEF DESCRIPTION OF THE DRAWINGS

FIG. 2 is a schematic representation of a protocol used to explain the present invention;

DETAILED DESCRIPTION OF THE PREFERRED EMBODIMENTS

Prior to describing the cordless telephone system of the present invention, a fundamental principle of the present invention is explained. Let it be assumed that the user wishes to hear the business message that was recorded. To do so, the user must issue a command to a telephone answering machine (TAM) unit of the cordless telephone system so that the TAM unit reproduces the business message and the user hears it. In the present invention, when the user supplies the TAM unit with the command to play back the business message, a special return signal from the TAM unit need not be received. Further, once the business message has been reproduced from the TAM unit, a further command need not be supplied to the TAM unit.

In accordance with the present invention, for example, in FIG. 2, the handset unit 1, the base unit 2 and a handset unit 1T having the TAM function (hereinafter referred to as TAM unit 1T) comprise a basic cordless telephone system, wherein the playback of an answering message and the recording of a business message in the user's absence are both carried out by the TAM unit 1T.

To reproduce the business message, the user pushes a business message playback key of handset unit 1, which transmits a command signal instructing the reproduction of the business message to TAM unit 1T via a transmission channel formed of handset unit 1, an up channel Cu to base unit 2, and a down channel Cd to TAM unit 1T. As a result, the business message is transmitted to handset unit 1 via a transmission channel formed of TAM unit 1T, the up channel Cu to the base unit 2, and the down channel Cd to handset unit 1. Consequently, the user can listen to the business message at handset unit 1.

Advantageously, the up and down channels Cu and Cd are paired duplex channels, and only one duplex channel is utilized by the cordless telephone system of the present invention. If the cordless telephone system is of low power type, a control channel can be used, and this control channel functions as the channels Cu and Cd. In any event, according to the cordless telephone system of the present invention, the user can listen to the business message merely by operating a key of his handset unit.

Figure 1A:
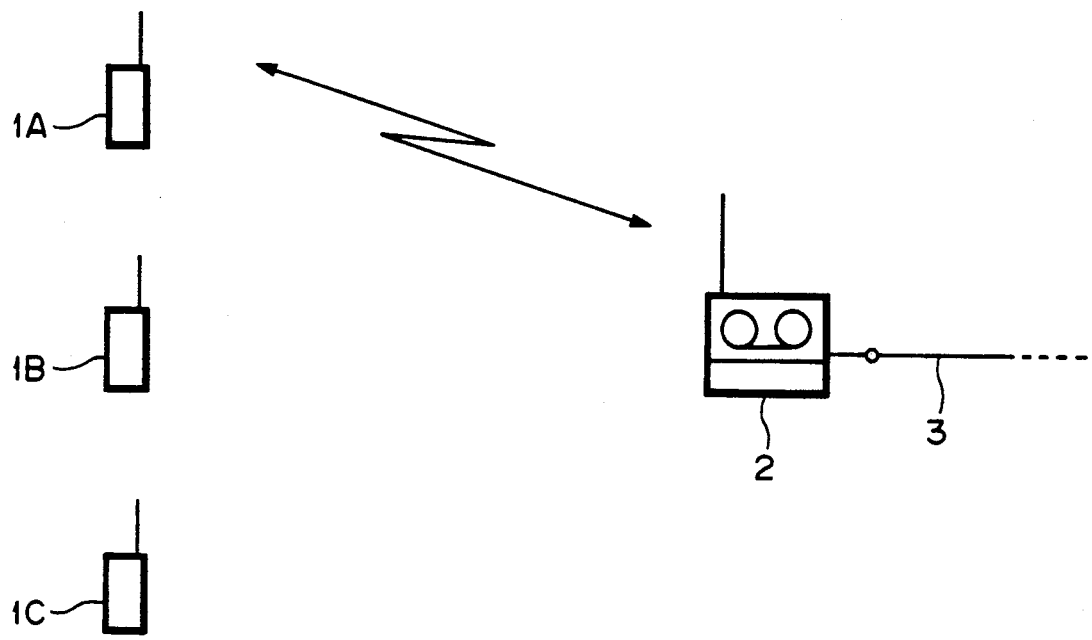
FIGS. 1A and 1B are schematic representations showing, respectively, cordless telephone systems each having a telephone answering machine function according to the prior art.
Figure 1B:
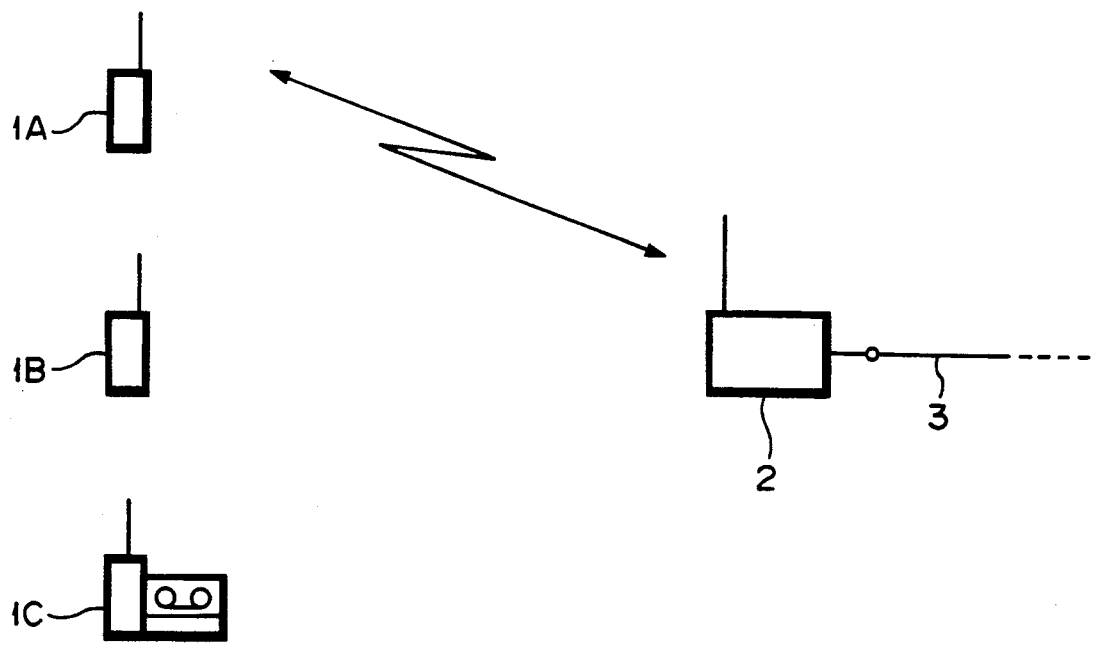
Figure 3:
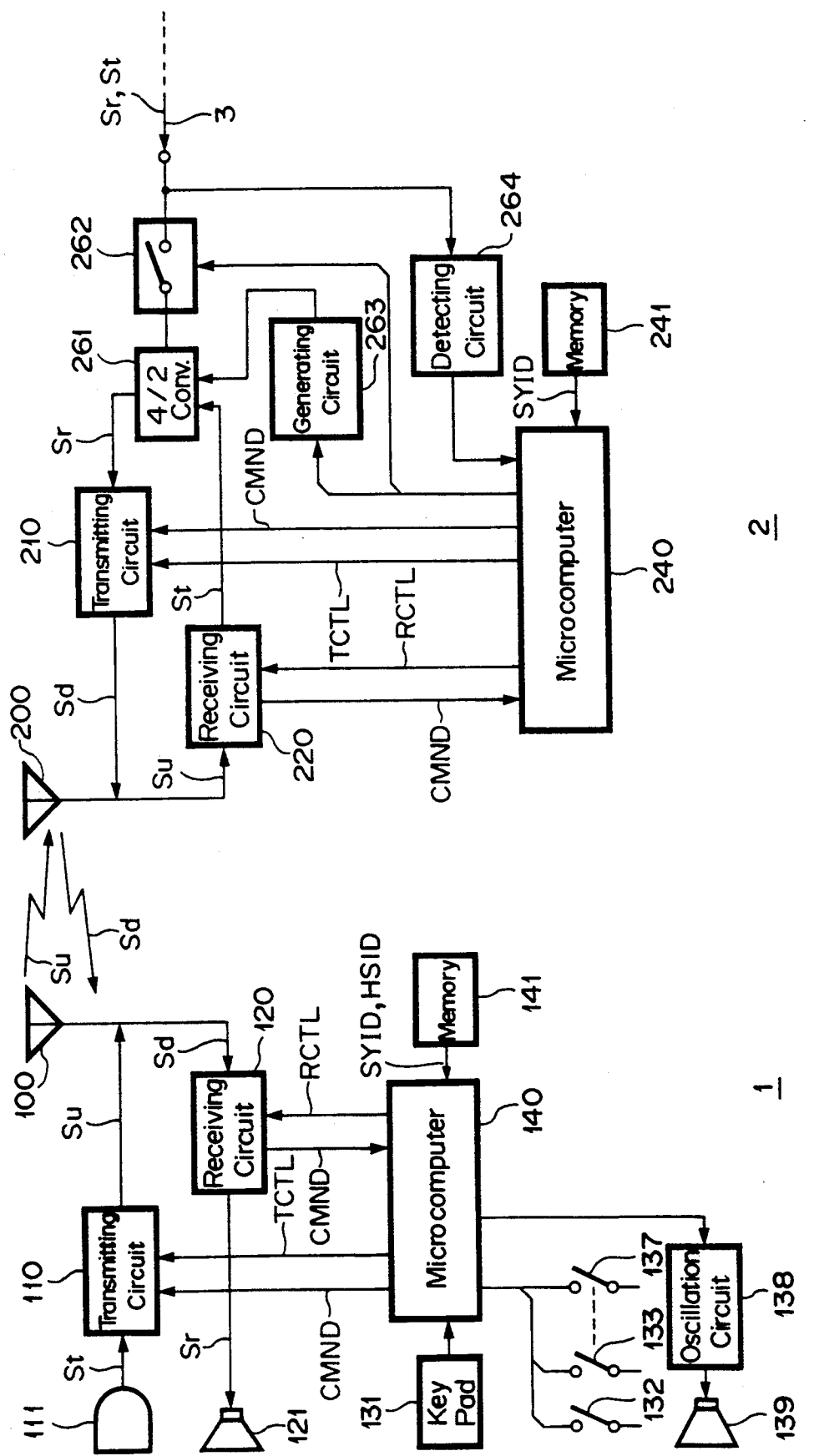
FIG. 3 is a block diagram of one embodiment of a cordless telephone system according to the present invention.
Figure 4:
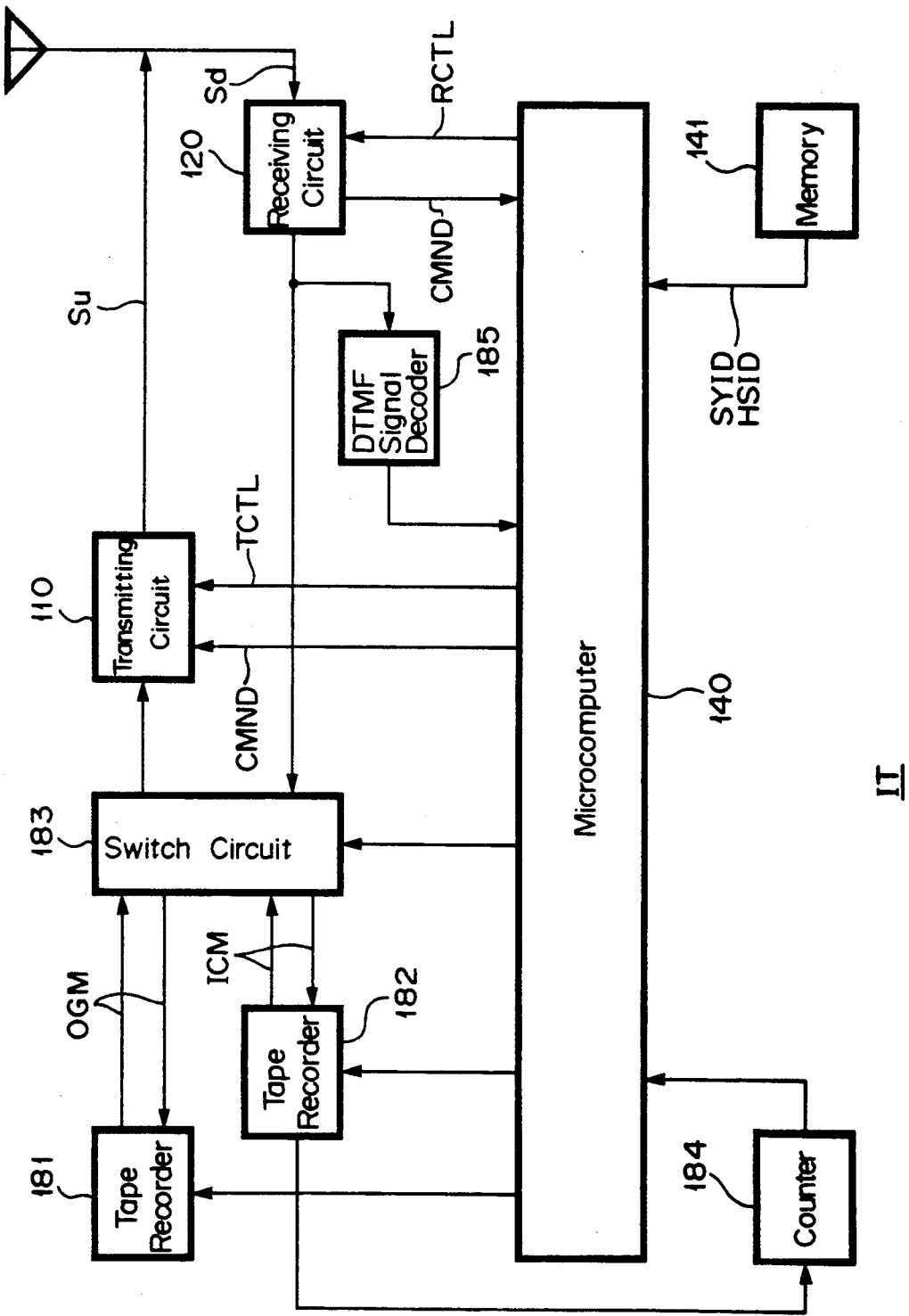
FIG. 4 is a schematic diagram showing a TAM unit used in the cordless telephone system shown in FIG. 3.

The present invention will now be described in detail, preferably in the embodiment wherein the cordless telephone is of the low power type. As shown in FIGS. 3 and 4, handset unit 1, TAM unit 1T having an automatic answering phone function, base unit 2 and telephone line network 3 comprise a cordless telephone system.

Handset unit 1 includes a transmitting circuit 110 and a receiving circuit 120. The transmitting circuit 110 functions to convert an audio signal St and a command signal CMND (which will be explained more fully later) into an FM (frequency-modulated) signal which is transmitted over an up channel Su to base unit 2 through an antenna 100. Receiving circuit 120 is adapted to receive and demodulate an FM signal received via a down channel Sd to recover an audio signal Sr or a command signal CMND transmitted thereto. The handset unit also includes a dial keypad 131 and a talk key 132, the talk key preferably being a nonlock-type pushbutton switch. In response to each depression of the talk key 132, the handset unit 1 is switched over between a standby mode and a talk mode. In the standby mode, the handset unit 1 awaits action by the user to initiate an outgoing call and also monitors the down channel Sd to await the reception of a connection request command from the base unit 2. In the talk mode, the handset unit 1 is capable of continuous reception and transmission between it and the base unit 2.

The handset unit is provided with auxiliary keys 133 and 137 such as a TAM key and other function keys formed of nonlock-type pushbutton switches. In addition, a speaker 139 is adapted to act as a ringer and a microcomputer 140 is adapted to control the overall operation of handset unit 1. In particular, the microcomputer 140 generates the command signal to be transmitted by the transmitting circuit 110 and also operates to discriminate the command signal transmitted from the base unit to receiving circuit 120. Further, the microcomputer generates transmit and receive control signals TCTL and RCTL, respectively, for enabling the operation of the transmitting circuit 110 and the receiving circuit 120 over designated channels. The operation of a particular routine 300 executed by the microcomputer 140 will be discussed below in conjunction with the flow chart shown, for example, in FIG. 5A.

A memory 141 is associated with microcomputer 140 and stores therein a system identifying code SYID formed of 25 bits and used to discriminate this cordless telephone system from other cordless telephone systems. Further, a remote station number [1], for example, is assigned to the handset unit 1 in order to discriminate the handset unit 1 from the TAM unit 1T, and this remote station number [1] is stored in the memory 141 as a handset identifying code HSID formed of 4 bits. Advantageously, when plural handset units 1 are included in the cordless telephone system, each handset unit may be identified by a respective handset identifying code HSID.

Base unit 2 includes a transmitting circuit 210 and a receiving circuit 220 similar to the transmitting circuit 110 and the receiving circuit 120 in the handset unit 1. In the standby mode, the receiving circuit 220 awaits an incoming call from the telephone line network 3 and also monitors the up channel Su to detect a connection request from the handset unit 1. In the talk mode, the base unit 2 is capable of continuous reception and transmission with the handset unit 1.

Base unit 2 also includes a system control microcomputer 240 which is adapted to carry out processing in a manner similar to that of the microcomputer 140 of the handset unit 1. Microcomputer 240 also controls the operation of the entire cordless telephone system. The operation of a particular routine 400 executed by microcomputer 240 will be described below in conjunction with the flow chart shown, for example, in FIG. 5B.

The base unit also is provided with a memory 241 similar to memory 141 of the handset unit 1. The memory 241 stores therein the system identifying code SYID and is also adapted to store a TAM flag TAMF. The TAMF flag is "0" when the cordless telephone system operates in its ordinary cordless telephone mode and is "1" when the system operates in a TAM mode.

A four-to-two line converting circuit 261, a switch circuit 262 which performs the same function as the hook switch of an ordinary telephone set, a dial signal generator 263 (i.e., DTMF signal) and a ring tone signal detecting circuit 264 also are included in base unit 2.

FIG. 4 shows an example of the TAM unit 1T which is generally constructed similarly to the construction of handset unit 1. However, elements 111, 121, and 131 to 139 of the handset unit 1 are replaced by elements 181 to 185. More particularly, audio signal recording and reproducing apparatus 181 and 182, e.g., cassette type tape recorders, are provided, wherein tape recorder 181 records and reproduces the answering message and the tape recorder 182 records and reproduces the business message. A switch circuit 183 is connected between the tape recorders 181, 182 and the transmitting and receiving circuits 110 and 120. The switch circuit 183 selectively switches audio signals between the tape recorders 181, 182 and the transmitting and receiving circuits under the control of the microcomputer 140.

Further, a tape counter 184 counts or measures the amount of tape transported in the tape recorder 182 from the beginning of the tape, this count being supplied to the microcomputer 140. Also a DTMF signal decoder 185 is coupled to receive the output signal of the receiving circuit 120 for remote control purposes. A remote station number representing an identifying code HSID of the TAM unit 1T is selected to be, for example, [15] and this identifying code is stored in memory 141. Furthermore, the microcomputer 140 is adapted to execute a routine 500 which will be described below in conjunction with the flow chart shown, for example, in FIG. 5C.

Figure 6:
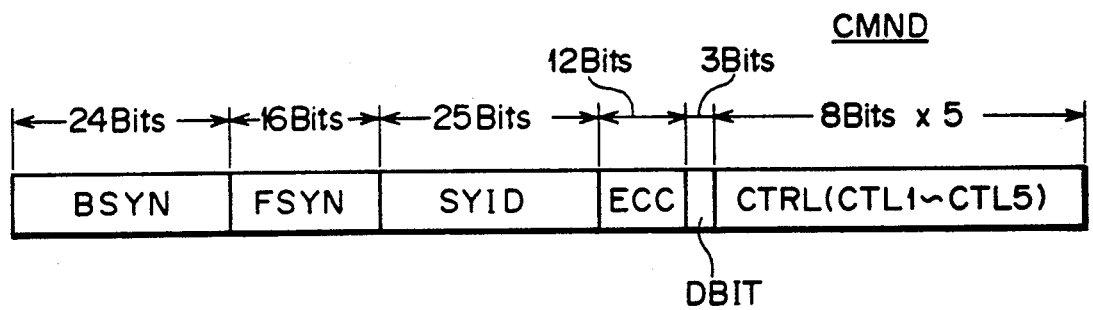
FIG. 6 illustrates a command signal format used in the cordless telephone system of the present invention.

FIG. 6 shows an example of a signal format that may comprise the command signal CMND. As shown in FIG. 6, this command signal CMND includes at the head thereof a bit synchronizing (sync.) signal, BSYN of, for example, 24 bits followed by a frame synchronizing signal FSYN of, for example, 16 bits. These signals BSYN and FSYN may have the particular bit patterns expressed as:

BSYN = "101010 . . . 10"
FSYN = "1100010011010110" . . . up channel
FSYN = "1001001100110110" . . . down channel

Further, the command signal CMND also includes, following the signal FSYN, a system identifying code SYID of, for example, 25 bits, an error correction code ECC of 12 bits associated with the system identifying code SYID, a dummy bit gap DBIT of 3 bits and a control code CTRL of 5 bytes. Preferably, the first byte of the control code indicates a control function to be performed by the handset unit 1 or the base unit 2 such as request to initiate an outgoing call, acknowledgment of a received command signal, receipt of an incoming call, actuation of ring oscillator, off-hook condition, end of conversation, and the like, and the second to fifth bytes are used as parameters or data related to the first byte. As an example, when the base unit 2 informs the handset unit 1 of the channel number of the communication channel over which a telephone conversation may take place, the control code byte CTL1 indicates a communication channel command, the control code byte CTL2 indicates the identifying code HSID of the handset unit 1 to be called, the control code byte CTL3 indicates the channel number of the communication channel and in the present embodiment bytes CTL4 and CTL5 are reserved and indicate dummy data.

When the handset unit 1, the TAM unit 1T or the base unit 2 receives the command signal CMND, the microcomputer 140 or 240 depending upon which unit receives the command signal determines whether or not the system identifying code SYID (and the handset identifying code HSID) included in the command signal CMND is coincident with the identifying code SYID stored in its own memory 141 or 241. Only when these identifying codes are coincident is the command signal CMND made valid; otherwise, the command signal CMND is invalid.

In the standby mode, the handset unit 1 awaits the initiation of an outgoing call by the user and also monitors the down control channel to await a connection request from the base unit 2. The TAM unit 1T also monitors the down control channel to await a connection request from the base unit 2. Further, the base unit 2 awaits an incoming call from the telephone line network 3 and also monitors the up control channel to await a connection request from the handset unit 1.

Figure 7:
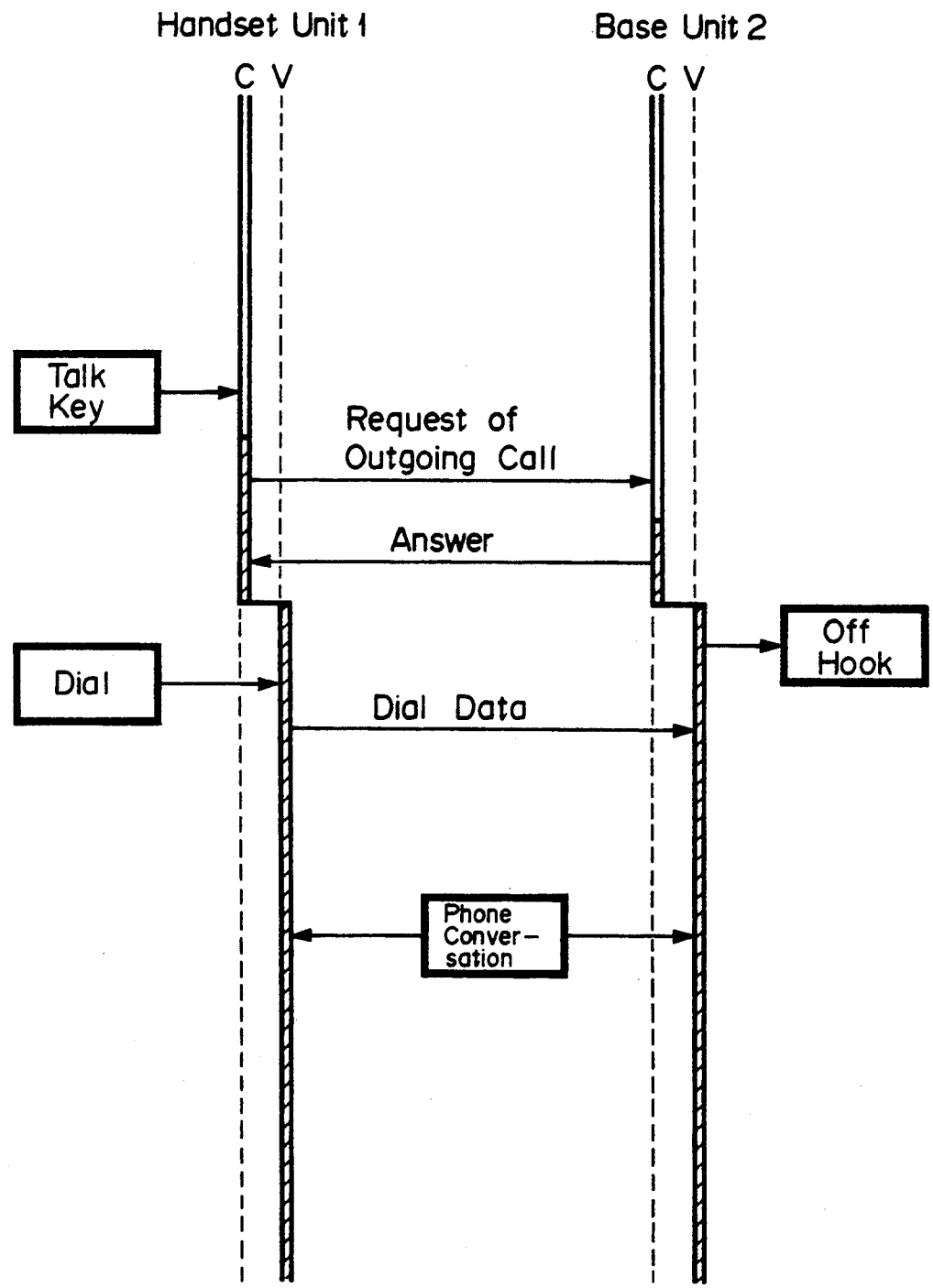
FIG. 7 is a schematic representation of a connection sequence in which an outgoing call is initiated by a handset unit.

If the user makes an outgoing call to the outside line from the handset unit 1, the connection sequence of FIG. 7 is followed. In FIG. 7, solid vertical lines represent the channels used by the handset unit 1 and the base unit 2, such as a control channel c or a communication channel v. Double vertical solid lines which are not hatched indicate that the handset unit 1 and the base unit 2 are in the standby mode, whereas lines that are hatched indicated that the handset unit 1 and the base unit 2 are in the talk mode or the like adapted to perform signal transmission. In FIG. 7, the time axes are not to scale, for the convenience of the drawing.

Let it be assumed that when the handset unit 1 is in its standby mode, the user pushes the talk key 132. This is detected by the microcomputer 140 and a transmission control signal TCTL is supplied from the microcomputer 140 to the transmitting circuit 110 so that the transmitting circuit and the receiving circuit 120 are conditioned for transmission and reception over the control channel, whereby the handset unit 1 is placed in the talk mode. Further, the microcomputer 140 generates the command signal CMND whose control code CTRL indicates an outgoing call request and whose identifying code HSID identifies handset unit 1. This command signal indicative of an outgoing call request is supplied to the transmitting circuit 110. The transmitting circuit 110 converts the command signal to an FM signal (FSK signal) and this FM signal is transmitted by antenna 100 to the base unit 2 over the up control channel Su.

Then, in the base unit 2, which monitors the up control channel in the standby mode, the FM signal is received at antenna 200 over the up channel Su and the command signal is demodulated therefrom by the receiving circuit 220. This command signal is supplied to the microcomputer 240 which determines whether or not the identifying code SYID included in the command signal is coincident with the identifying code SYID stored in the memory 241. If it is, the outgoing call request transmitted by the handset unit 1 triggers the microcomputer 240 to apply the transmission control signal TCTL to the transmitting circuit 210 which conditions the transmitting circuit 210 to perform a transmission operation over the down control channel. Further, the microcomputer 240 generates a command signal having a control code CTRL which acknowledges the outgoing call request, an identifying code HSID and a channel number identifying the communication channel. This command signal acknowledging the outgoing call request is supplied to the transmitting circuit 210 to be converted to an FM signal and supplied over the down control channel by the antenna 200 to the handset unit 1 and the TAM unit 1T.

When this FM command signal is returned to the handset unit 1 from the base unit 2 over the down control channel, it is received by antenna 100 and fed to the receiving circuit 120 whereat the command signal is demodulated and applied to the microcomputer 140. Since the system and handset identifying codes SYID and HSID included in the command signal are coincident with the identifying codes SYID and HSID stored in the memory 141, the transmitting circuit 110 and the receiving circuit 120 are switched by the microcomputer to the communication channel having the channel number identified by the control signal CTRL of the received command signal. Microcomputer 140 supplies the control signals TCTL and RCTL to the transmitting and receiving circuits for this switch over.

When the handset unit 1 is switched over to the communication channel by the command signal transmitted from base unit 2, the microcomputer 240 supplies a transmission control signal TCTL and a reception control signal RCTL to the transmitting circuit 210 and the receiving circuit 220 of the base unit to thereby switch the transmitting and receiving circuits to the same communication channel having the same channel number to which the handset unit 1 has been switched in response to the command signal produced by the microcomputer 240.

Accordingly, a communication channel is established between the handset unit 1 and the base unit 2.

It will be appreciated that TAM unit 1T receives the FM command signal transmitted from the base unit 2 over the down channel Sd, but the TAM unit remains in its standby mode because the identifying code HSID transmitted thereto is not coincident with its own identifying code HSID.

The microcomputer 240 in the base unit 2 also sets switching circuit 262 to its off-hook condition to connect the transmitting circuit 210 and the receiving circuit 220 to the telephone line network 3 via the converting circuit 261 and the switch circuit 262.

Accordingly, the handset unit 1 is connected to the telephone line network 3 via the established communication channel and the base unit 2.

When the user who initiated this outgoing call operates the dial key pad 131 of the handset unit 1 to generate signals identifying the telephone number of the party to be called, a command signal whose control code CTRL indicates that telephone number information is being transmitted and identifies that telephone number is generated. This command signal is converted to an FM signal and transmitted over the up communication channel Su. This command signal is received by the receiving circuit 220 in base unit 2 and supplied to the microcomputer 240 which detects the telephone number information and identification to control generating circuit 263 to generate dialing signals corresponding to the telephone number transmitted from the handset unit 1. These dialing signals are transmitted through the converting circuit 261 and the switch circuit 262 to the telephone line network 3.

When the called party answers, audio signals Sr from the called party are supplied to the transmitting circuit 210 via the signal path from the telephone line network 3, the switch circuit 262 and the converting circuit 261. Accordingly, these signals Sr are converted into FM signals and transmitted from the antenna 200 to the handset unit over the down communication channel. These FM signals are received by the handset unit 1 and the audio signals Sr are demodulated by the receiving circuit 120 and coupled to a telephone speaker 121. Audio signals St produced by a telephone transmitter, or microphone, 111 are supplied to the transmitting circuit 110 in which they are converted to signals for transmission from the antenna 100 to the base unit 2 over the up communication channel Su. FM signals are received by the base unit 2, from which audio signals St are demodulated by the receiving circuit 220, supplied through the converting circuit 261 and the switch circuit 262 to the telephone line network 3 and transmitted to the called party.

Accordingly, the communication channel established between the handset unit 1 and the base unit 2 permits a telephone conversation to be carried out between the called party and the handset unit 1.

Figure 8:
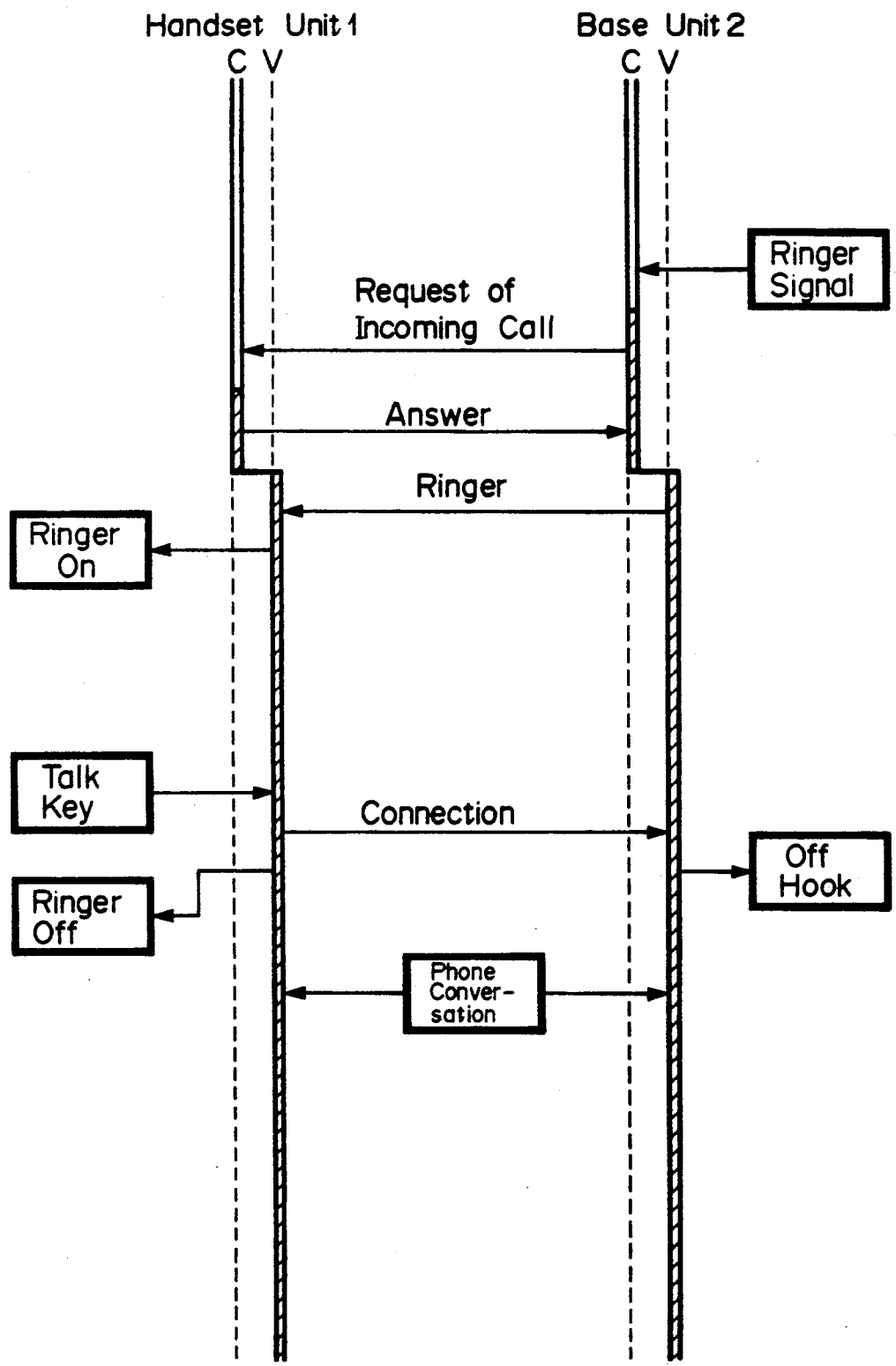
FIG. 8 is a schematic representation of a connection sequence in which an incoming call is received at the handset unit.

The sequence of operation to receive and supply an incoming call to handset unit 1 is generally shown in FIG. 8.

When an incoming call arrives through the telephone line network 3, a ring signal indicative of such incoming call is detected by the detecting circuit 264, and a detection signal is supplied to the microcomputer 240. At this time, the status of the TAM flag TAMF in the memory 241 is checked, and if the user has not requested the telephone answering function, as will be described below, the TAM flag TAMF=0. Accordingly, an incoming call command signal having a control code CTRL indicative of the arrival of the incoming call, an identifying code HSID identifying the handset unit 1 and a channel number identifying the communication channel is generated by the microcomputer 240. This incoming call command signal is transmitted from the base unit 2 over the down control channel.

In the handset unit 1, it is determined whether or not the identifying codes SYID and HSID received over the down channel are coincident with those of the handset unit. It is assumed herein that they are coincident with each other, thus enabling the transmission of a FM signal. Consequently, microcomputer 140 generates a command signal whose control code CTRL acknowledges the incoming call and whose handset unit identifying code HSID identifies this handset unit. This command signal is transmitted to the base unit 2 over the up control channel. When the acknowledgement command signal is received at the base unit, the base unit is switched from the control channel to the communication channel that had been identified in the command signal previously transmitted to the handset unit 1. Similarly, when handset unit 1 transmits the acknowledgment command signal, it is switched to the communication channel identified in the command signal that had been received from the base unit 2.

Although the incoming call command signal transmitted by base unit 2 is received by the TAM unit 1T, the identifying codes HSID of the command signal and the TAM unit are not coincident with each other so that the incoming call command signal from the base unit is ignored by the TAM unit.

Next, in the base unit 2, a ringer command signal, whose control code CTRL indicates that the ringer at the handset unit should be actuated, is generated and transmitted via the communication channel. When the ringer command signal is received by handset unit 1 the microcomputer 140 controls the oscillation circuit 138 to generate a ringer signal, and this ringer signal is supplied to the loudspeaker 139 which emanates a ringing sound to announce the arrival of the incoming call.

If the user of handset unit 1 depresses talk key 132, an answer command signal having a control code indicating that the incoming call should be answered, the handset unit code HSID, and an indication that the talk key 132 has been depressed, is generated and transmitted. Simultaneously, the oscillation circuit 138 in the handset unit 1 is turned OFF and the ringing sound also is turned OFF.

When this command signal from the handset unit 1 is received by the base unit 2, the microcomputer 240 operates the switch circuit 262 of the base unit to its off-hook state. Accordingly, the base unit 2 is connected to the telephone line network 3. Hence, a communication channel is established between the handset unit 1 and the base unit 2 and a telephone conversation can ensue between the called party and the handset unit 1.

Figure 9:
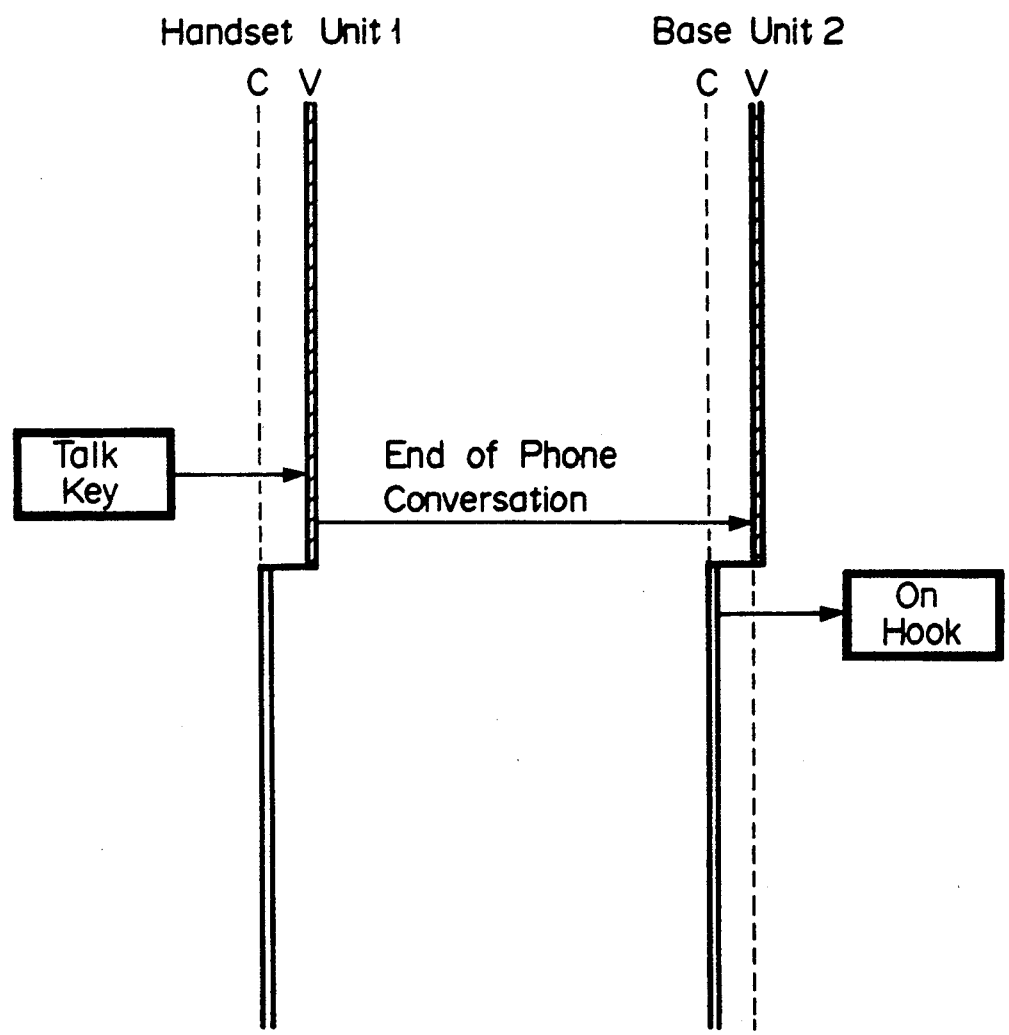
FIG. 9 is a schematic representation of a connection sequence for ending a telephone conversation.

When the telephone conversation is finished, as shown, for example, in FIG. 9, the user depresses talk key 132 of the handset unit 1. Microcomputer 140 then generates a terminate command signal having a control code CTRL indicative of the end of the telephone conversation and the handset unit identifying code HSID, and this terminate command signal is transmitted to the base unit 2 as an FM signal over the up communication channel Su. At the base unit 2, the receiving circuit 220 recovers the terminate command signal and the microcomputer 240 determines that the telephone conversation has ended. As a consequence, the transmitting circuit 210 of the base unit 2 is inhibited by the control signal TCTL and the receiving circuit 220 is set to its receiving mode for monitoring the up control channel by the control signal RCTL. The microcomputer also sets switch circuit 262 to its on-hook state, and accordingly, the base unit 2 is placed in the standby mode.

Likewise, at the handset unit 1, after the terminate command signal is transmitted thereby, transmitting circuit 110 is inhibited by the control signal TCTL produced by microcomputer 140, and the receiving circuit 120 is set by control signal RCTL to its standby mode to monitor the down control channel.

Let it be assumed that when the handset unit 1 is in its standby mode, the TAM key 133 is pushed and [1] key of the dial key pad 131 is pushed. Microcomputer 140 responds to these keys to generate a TAM set command signal whose control code CTRL sets the TAM flag TAMF of the memory 141 to "1" and whose identifying code HSID identifies the handset unit 1. This TAM set command signal is transmitted to the base unit 2 via the up control channel. The TAM set command signal is received at the base unit in substantially the same way as the outgoing call request command signal when the user wishes to make an outgoing call. Now, however, the TAM flag TAMF of the memory 241 is set to "1" in response to the TAM set command signal. Then, an acknowledge command signal whose control code CTRL indicates that the TAM flag TAMF is set to "1" and which contains the identifying code HSID identifying the handset unit 1 is generated and transmitted over the down control channel. Thus, the base unit 2 is placed in the TAM standby mode.

When the acknowledge command signal indicating that the TAM flag TAMF is set to "1" is received at the handset unit 1, the handset unit is set to its TAM standby mode. If, while in the TAM standby mode, the TAM key 133 of the auxiliary keys 133 to 137 is pushed and then the [0] key of the dial key pad 131 is pushed, the TAM flag TAMF of the memory 141 is reset to "0" in the same way as the TAM flag TAMF had been set to "1" when the [1] key had been pushed, as described above.

An incoming call will be answered while the base and handset units are in their TAM mode as follows.

When the incoming call arrives via the telephone line network 3, it is detected by the detecting circuit 264 in the manner described above. Since TAMF="1", an incoming call command signal is generated by microcomputer 240, having a control code CTRL indicating the arrival of the incoming call, together with an identifying code HSID which identifies the TAM unit 1T and a channel number identifying the communication channel over which communication will be established. This incoming call command signal is transmitted to the TAM unit 1T via the down control channel.

Thereafter, in substantially the same way as described above when an ordinary incoming call is received and TAMF=0 (as shown in the connection sequence of FIG. 8), the acknowledgement command signal is transmitted from TAM unit 1T and received by the base unit 2 to switch the control channel to the communication channel for connecting the TAM unit 1T to the base unit 2. The incoming call is answered by the TAM unit in substantially the same way as an incoming call is answered by handset unit 1, whereupon an answer command signal is transmitted from the TAM unit 1T to the base unit 2 and hence, the base unit is connected to the telephone line network 3 through the switch circuit 262. Thus, the TAM unit 1T operates in a communication mode just as handset unit 1 did when it answered an incoming call.

When the incoming call is answered by the TAM unit, the microcomputer 140 of the TAM unit 1T causes the tape recorder 181 to be placed in the playback mode to initiate reproduction of the answer message. As audio signal OGM representing this answer message is supplied to the transmitting circuit 110 from the tape recorder 181 through the switch circuit 183. Accordingly, the answer message signal OGM is transmitted to the telephone line network 3 via the base unit 2 to be heard by the calling party.

When the answer message is reproduced fully, the microcomputer 140 sets the tape recorder 181 to its stop mode and places the tape recorder 182 in its recording mode, thereby initiating the recording operation. Hence, the calling party may relay a business message, which is transmitted as an audio signal ICM to and through the base unit 2 and received by the receiving circuit 120 in the TAM unit 1T. The thus received audio signal ICM is supplied through the switch circuit 183 to the tape recorder 182, in which it is recorded.

During the recording of the business message, the detecting circuit 264 in the base unit 2 detects whether or not the calling party places his telephone set in the on-hook state to terminate the telephone call. Likewise, the TAM unit 1T, monitors whether or not a terminate command signal indicative of the end of a telephone conversation is transmitted from the base unit 2.

When the calling party finishes his business message and places his telephone set in the on-hook state, the AC level of the telephone line network 3 changes as is conventional (the change of the AC level being presented in the form of a beep tone), and this change is detected by the detecting circuit 264. Then, the microcomputer 240 produces the terminate command signal indicative of the end of the telephone conversation, and this terminate command signal is transmitted from the base unit 2 to the TAM unit. Additionally, the switch circuit 262 of the base unit 2 is placed in the on-hook state and the base unit 2 is set to its standby mode. Receipt by the TAM unit 1T of the terminate command signal places tape recorder 182 in its stop mode and the answer message tape in the tape recorder 181 is rewound to its beginning. Thus, the TAM unit 1T is set to its standby mode. If another incoming call is received, the answer message is reproduced by tape recorder 181 and the business message is recorded by tape recorder 182 of the TAM unit.

The manner in which the business message may be reproduced remotely by a user is as follows.

When the handset unit 1 is in its standby mode, the user pushes the TAM key 133 of the handset unit 1 followed by the [*] key of the dial key pad 131. This initiates the execution of routines 300, 400, and 500 to play back the business massage to handset unit 1.

Figure 5A:
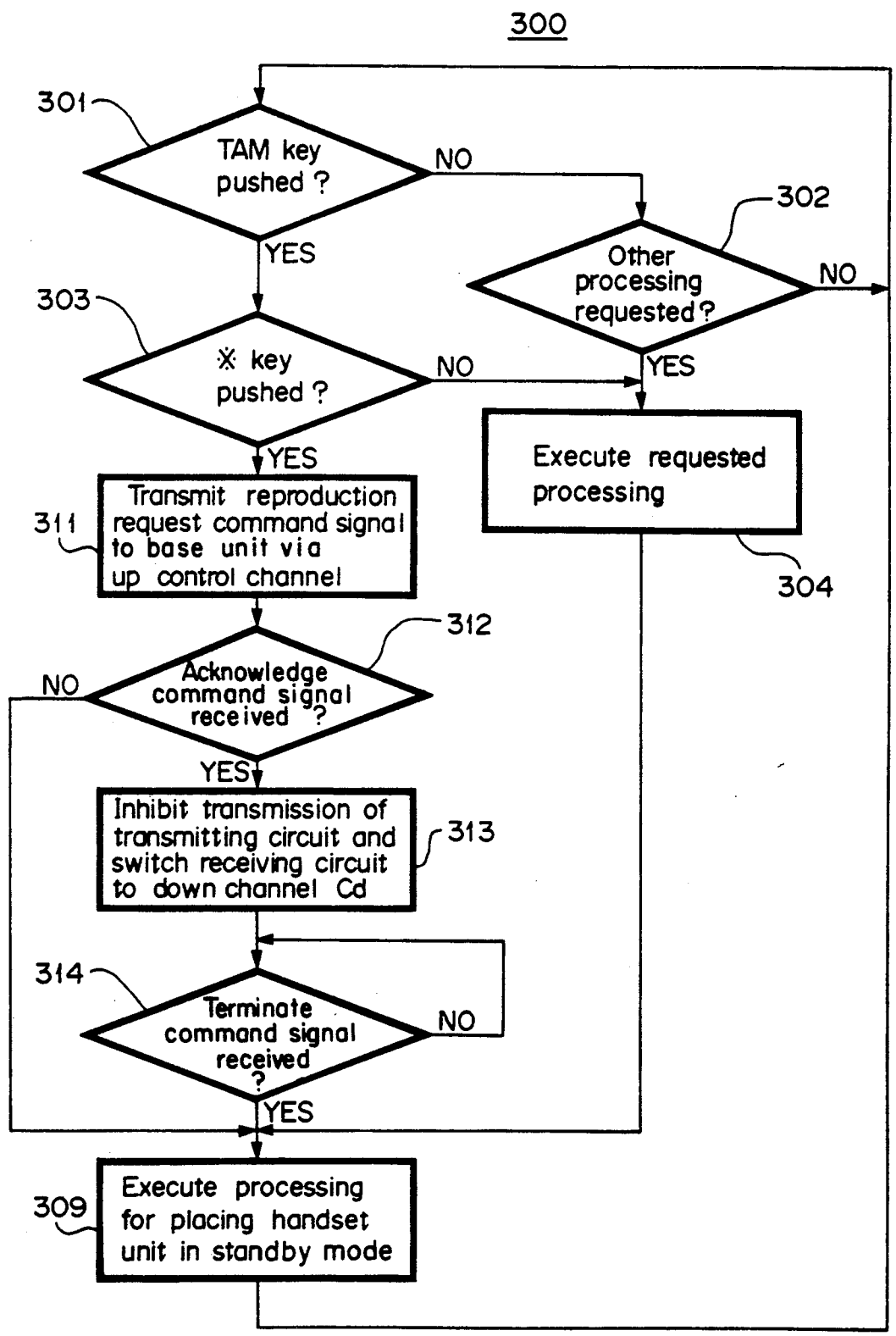
FIG. 5A is a flow chart useful in explaining the reproducing operation of a business message by a handset unit.

More specifically, referring to routine 300 shown in FIG. 5A, while the handset unit 1 is in its standby mode, inquiry 301 determines whether or not the TAM key 133 is pushed. If the TAM key 133 is not pushed, this inquiry is answered NO and the routine proceeds to inquiry 302. Here, it is determined whether or not other processing has been requested, such as making an outgoing call or the like. If not, then the routine returns to inquiry 301. Thus, the routine cycles through steps 301 and 302 in the standby mode.

If other processing, such as making an outgoing call or the like, has been requested, as represented by a YES at inquiry 302, then the routine advances to step 304, whereat the requested processing is executed. Then, the routine proceeds to instruction 309, which places the handset unit 1 in its standby mode after such other processing is completed; whereafter the routine returns to inquiry 301.

If the TAM key 133 is depressed, inquiry 301 is answered YES and the routine proceeds to inquire, at 303, whether or not the [*] key is pushed immediately after the TAM key 133 was depressed. If the [*] key is not pushed, as represented by a NO at inquiry 303, the routine advances to step 304. Here, the processing corresponding to the particular key which is pushed immediately after the depression of the TAM key 133 is executed. For example, if the [1] key is pushed immediately after the TAM key 133 is depressed, the subroutine (not shown) for setting the TAM flag TAMF of the base unit 2 to "1" is executed.

Assuming that the [*] key is pushed after the depression of the TAM key 133, the routine advances from inquiry 303 to instruction 311, whereat a reproduction request command signal whose control code CTRL indicates a request for the reproduction of the business message and whose identifying code HSID identifies the handset unit 1 is generated. This command signal is transmitted to the base unit 2 via the up control channel.

Figure 5B:
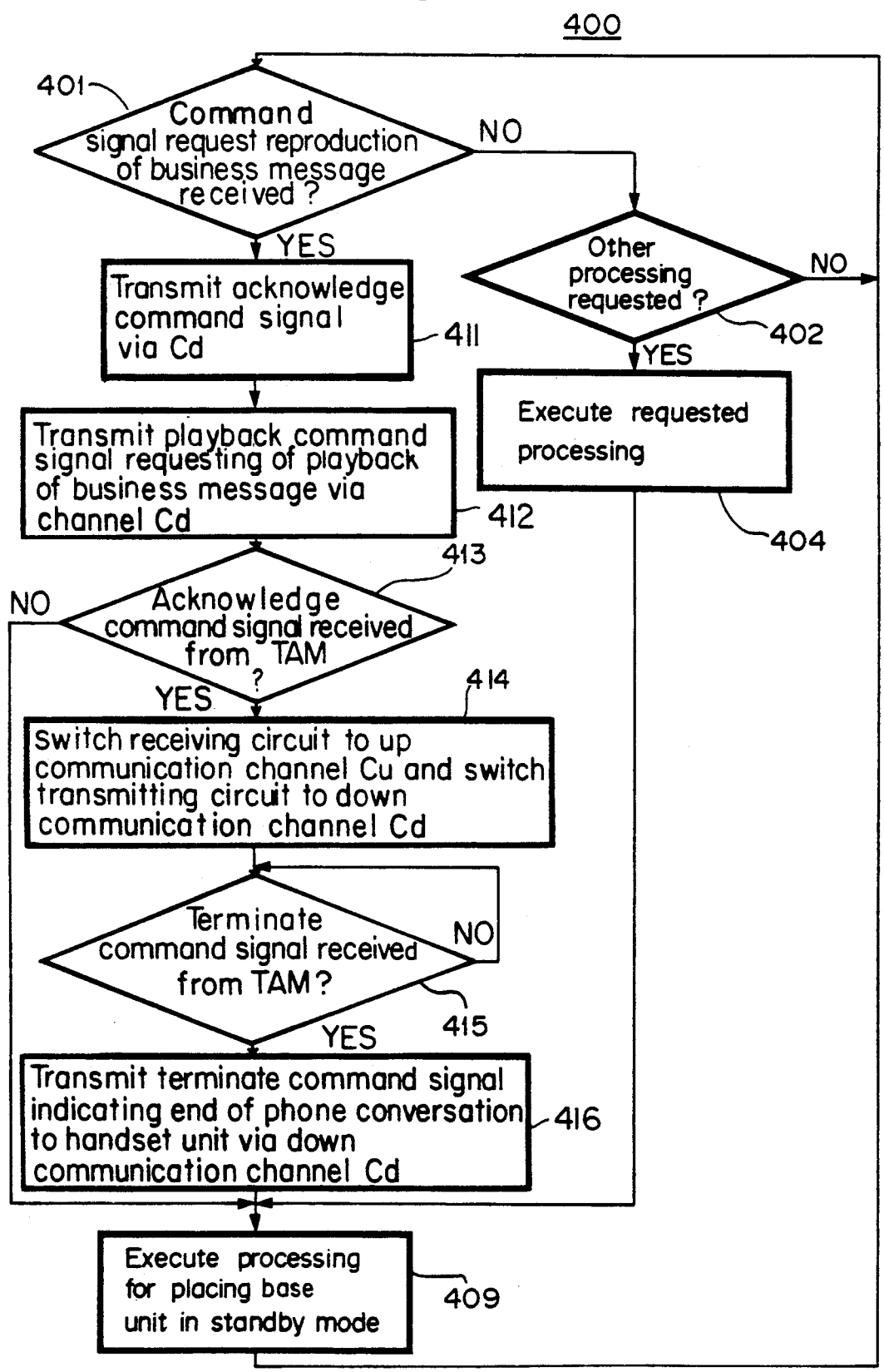
FIG. 5B is a flow chart useful in explaining the operation of the base unit when the business message is reproduced.
Figure 5C:
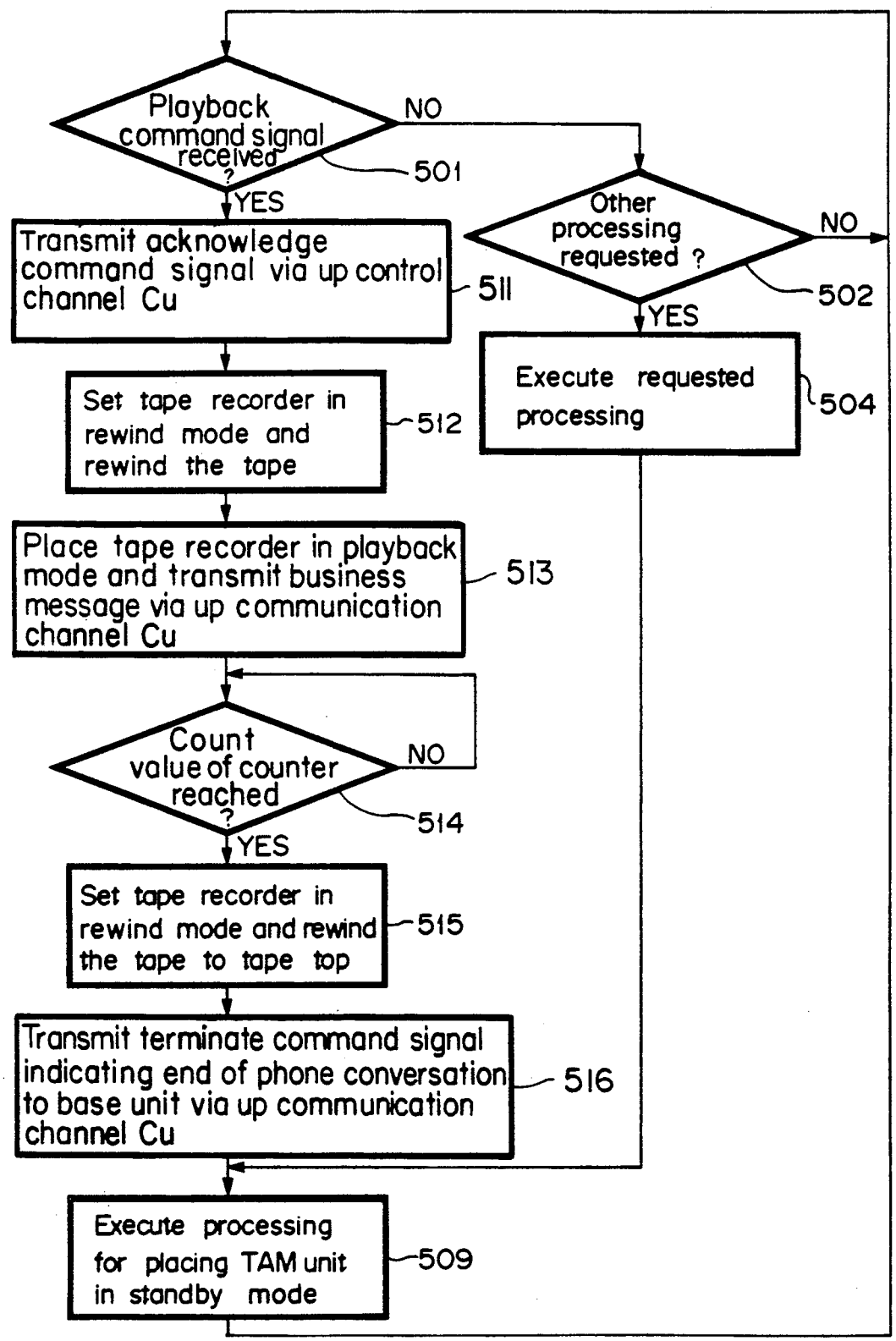
FIG. 5C is a flow chart useful in explaining the operation of the TAM unit when the business message recorded thereon is reproduced.

The base unit 2, which is in its standby mode, executes routine 400, shown in FIG. 5B. Initially, inquiry 401 determines whether or not the reproduction request command signal is received. If not, inquiry 401 is answered NO and the routine proceeds to the next inquiry 402. Inquiry 402 determines whether or not other processing, such as the arrival of an incoming call or the like, has been requested. If not, the routine returns from inquiry 402 to inquiry 401. In a manner similar to that described above, when in the standby mode, the routine cycles through inquiries 401 and 402.

If other processing has been requested, as represented by a YES at inquiry 402, the routine advances to step 404, whereat the requested processing is executed. Thereafter, the routine proceeds to step 409, which places the base unit 2 in its standby mode, and then routine returns to inquiry 401.

However, in the present example, the reproduction request command signal was transmitted and is detected, and so the routine proceeds from inquiry 401 to instruction 411, whereat an acknowledgment command signal whose control code CTRL acknowledges the request to reproduce the business message, whose identifying code HSID identifies handset unit 1 and whose channel number Cd identifies the down communication channel, is generated and transmitted to the handset unit 1 via the down control channel.

Then, returning to routine 300 of FIG. 5A, in the handset unit 1, inquiry 312 is executed after step 311 to determine whether or not the acknowledge command signal produced by base unit 2 in response to instruction 411 is received. If this command signal is not received within a predetermined period, as represented by a NO at inquiry 312, then routine 300 advances to step 309, discussed above. However, in present example, the acknowledge command signal is received, and routine 300 proceeds from inquiry 312 to step 313, whereat the transmission of transmitting circuit 110 of the handset unit 1 is inhibited and the receiving circuit 120 is switched to the down communication channel Cd identified in the received acknowledge command signal. Then, inquiry 314 is repeatedly executed until a terminate command signal whose control code CTRL indicates the end of the telephone conversation is received.

Accordingly, this transmission of the audio signal ICM representing the business message from the base unit 2 to the handset unit 1 via the down communication channel Cd permits the user at handset 1 to receive and listen to this business message.

Returning to routine 400 executed in the base unit 2, after the acknowledge command signal is transmitted in instruction 411, a playback command signal whose control code CTRL represents a request for the reproduction of the business message, whose identifying code HSID identifies the TAM unit 1T and whose channel number Cu identifies the up communication channel is generated by instruction 412 and transmitted to the TAM unit 1T via the down control channel. It will be appreciated that the up communication channel Cu identified in the command to the TAM unit 1T is paired with the down communication channel Cd identified in the command transmitted to the handset unit 1 in step 411.

Turning to the TAM unit 1T, which is in its standby mode, and the routine 500 executed thereby (FIG. 5C), inquiry 501 determines whether or not the playback command signal is received. If not, as represented by a NO at inquiry 501, the routine proceeds to the next inquiry 502 whether or not other processing has been requested, such as the reproduction of the answer message or the like. If not, then routine 500 returns to inquiry 501 and cycles through inquiries 501 and 502 while the TAM unit is in its standby mode.

If other processing, such as reproduction of the answer message or the like, had been requested, as represented by a YES at inquiry 502, then the routine proceeds to instruction 504 which carries out the requested processing, and then the routine proceeds to instruction 509 which places the TAM unit 1T in its standby mode. Then, the TAM unit returns to step 501.

However, in the present example, the playback command signal requesting reproduction of the business message had been produced in the base unit, as indicated by step 412, so inquiry 501 at the TAM unit is answered YES and routine 500 proceeds to step 511, whereat an acknowledge command signal whose control code CTRL indicates an acknowledgement to the request for reproduction of the business message and whose identifying code HSID identifies the TAM unit 1T is generated and transmitted to the base unit 2 via the up control channel.

Returning to the base unit 2 and routine 400, inquiry 413 determines whether or not the acknowledge command signal produced at step 511 is received. If this command signal is not received within a predetermined period of time, routine 400 returns to step 409. However, since the acknowledge command signal is received, inquiry 413 is answered YES and routine 400 advances to step 414. Here, the receiving circuit 220 of the base unit 2 is switched to the up communication channel Cu identified in the playback command signal transmitted to the TAM unit and the transmitting circuit 210 is switched to the down communication channel Cd identified in the acknowledge command signal transmitted to the handset unit at step 411. Also, the output terminal of the receiving circuit 220 is connected to the input terminal of the transmitting circuit 210 via the converting circuit 261 (FIG. 3), and inquiry 415 is executed cyclically until the terminate command signal whose control code CTRL indicates the end of a telephone conversation is received from the TAM unit.

Accordingly, the audio signal ICM representing the business message is transmitted to the base unit 2 from the TAM unit 1T via the up communication channel Cu, received by receiving circuit 220, and transmitted to the handset unit 1 by transmitting circuit 210 over the down communication channel. Hence, the up communication channel Cu and the down communication channel Cd may be thought of as being paired.

In the TAM unit 1T, routine 500 proceeds from step 511 to step 512, whereat the tape recorder 182 is set in its rewind mode to rewind to its beginning the tape on which business messages have been recorded. While the tape is being rewound, the amount of tape being transported is counted by the counter 184, and after the tape has been adequately rewound, the tape recorder 182 is placed in the playback mode by instruction 513 to sequentially play back the recorded business messages. The audio signal ICM corresponding to these business messages are supplied through the switch circuit 183 (FIG. 4) to the transmitting circuit 110 and transmitted via the up communication channel Cu. Thus, each business message played back by the TAM unit 1T is supplied to the handset unit 1 via the signal path formed of the TAM unit 1T, the up communication channel Cu, the base unit 2, the down communication channel Cd and the handset unit 1. Consequently, the user can listen to the business messages that were recorded sequentially in the TAM unit 1T.

While the business messages are reproduced by the tape recorder 182, the routine executed by microcomputer 140 proceeds to inquiry 514, whereat the count value of the counter 184 is monitored.

When the amount of tape being played back is equal to the count value determined at step 512, or if all business messages are played back, the routine proceeds from inquiry 514 to instruction 515. Here, the tape recorder 182 once again is set in its rewind mode to rewind the tape to it beginning, whereupon the tape recorder is placed in the stop mode. That is, the tape recorder is reset and made ready to record business messages anew. In the next step 516, a terminate command signal whose control code CTRL indicates the end of a telephone conversation and whose identifying code HSID identifies the TAM unit 1T is generated and is transmitted to the base unit 2 via the up communication channel Cu. Then, the routine proceeds to instruction 509 and TAM unit 1T enters the standby mode.

In the base unit 2, when the terminate command signal from the TAM unit 1T is transmitted thereto, this command signal is detected at inquiry 415, and the routine proceeds from inquiry 415 to instruction 416. In step 416, a terminate command signal whose identifying code HSID identifies the handset unit 1 is generated and transmitted to the handset unit 1 via the down communication channel Cd. Then, the routine advances to step 409 and the base unit 2 enters its standby mode.

Returning to the handset unit 1, when the terminate command signal is transmitted thereto from the base unit 2, this command signal is detected at inquiry 314, and the routine proceeds from inquiry 314 to step 309, whereat the handset unit 1 enters its standby mode.

The user may record the answer message from a location remote from the TAM unit as follows.

When the handset unit 1 is in the standby mode, the TAM key 133 of the handset unit 1 is pushed and then [#] key of the dial key pad 131 is pushed.

Then, in a manner similar to that whereby the business message is reproduced, as described above, a signal path comprised of the handset unit 1, the up communication channel Cu, the base unit 2, the down communication channel Cd and the TAM unit 1T is formed. The user now may recite his desired answer message into the telephone transmitter (microphone) 111 of the handset unit 1, whereupon the audio signal OGM representing such answer message is supplied to the TAM unit 1T from the handset unit 1 through the base unit 2, and recorded on the tape of the tape recorder 181.

If the talk key 132 of the handset unit 1 is pushed at the completion of recording the answer message, then the terminate command signal whose control code CTRL indicates the end of a telephone conversation is transmitted to the base unit 2 from the handset unit 1. Then, in the same manner as aforedescribed wherein the business message has been reproduced, the respective routines carry out instructions in the handset unit 1, the base unit 2 and the TAM unit 1T, such that they are all placed in their standby modes.

As described above, the present invention enables the user to listen to business messages by way of handset unit 1 and thus need not be present at the base unit or at the handset unit having the TAM function and thus need not push any special function button thereof in order to hear the recorded business messages, which ensures use of the advantageous features of a cordless telephone system.

Further, the base unit 2 needs only one transmitting circuit 210 and one receiving circuit 220 and special transmitting or receiving circuits need not be provided at the TAM unit 1T. Thus, even if the allocation of channels is restricted by regulations such as the FCC or the like, the cordless telephone system of the present invention nevertheless can be utilized without difficulty. From a practical standpoint, once the user purchases the handset unit 1 and the base unit 2, he can purchase the TAM unit 1T at a later time as an add-on unit.

In addition, since the TAM unit 1T is independent of the handset unit 1 and the base unit 2, the TAM unit 1T may be freely located at any desired location within the service area of the base unit 2. For example, the TAM unit 1T may be disposed at an unobtrusive location, such as at the corner of a room or the like.

Figure 10:
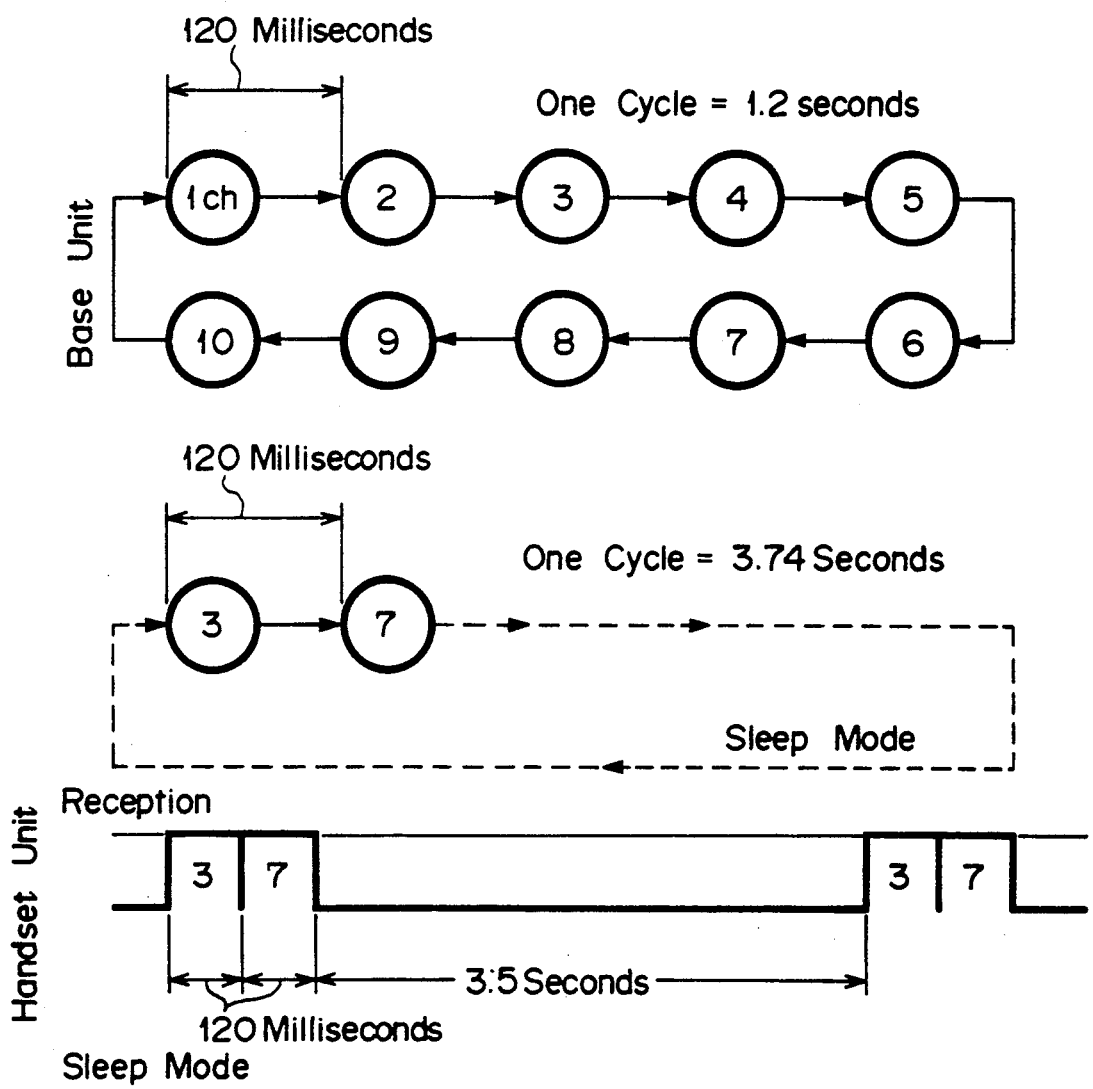
FIG. 10 is a timing chart useful in explaining another embodiment of the cordless telephone system according to the present invention.

A second embodiment of a cordless telephone system incorporating the present invention will be described below with reference to FIG. 10.

In the United States of America, 10 duplex channels normally are provided for a cordless telephone but a control channel is not used. Similarly, in Japan, a control channel is not used with a low power, cordless telephone, and in a cordless telephone system having no control channel, the base unit 2 might be connected to the handset unit 1 or the TAM unit 1T as shown in FIG. 10.

More specifically, since the base unit 2 is powered by a commercially available AC power line, in the standby mode, the base unit 2 sequentially receives and monitors channels 1, 2, 3, . . . 10, and the base unit 2 cyclically repeats the monitoring operation while awaiting a connection request from the handset unit 1. At that time, the base unit 2 needs about 120 milliseconds per channel to detect which handset unit has transmitted the connection request.

Accordingly, the handset unit 1 can request connection to the base unit 2 by utilizing any arbitrary channel of channels 1, 2, 3, . . . 10.

Further, in the standby mode, the handset unit 1 receives and monitors a vacant channel, e.g., the third channel and the seventh channel to check for the presence or absence of a connection request from the base unit 2. If the connection request from the base unit 2 is not present, the handset unit 1 enters a so-called sleep mode of about 3.5 seconds. Thus, the handset unit 1 cycles through this monitor/sleep operation and the base unit 2 can request connection to the handset unit 1 by utilizing the third channel or the seventh channel. Since the handset unit 1 is placed in the sleep mode for most of the cycle period of the standby mode, the consumption of power is reduced.

The TAM unit 1T operates in a manner similar to that of the handset unit. When a business message is reproduced, the handset unit 1, the base unit 2 and the TAM unit 1T are connected to one another by utilizing the up and down control channels Cu and Cd, as shown in FIG. 2.

In one application of the present invention, a plurality of handsets units 1 and TAM units 1T may be provided. In that case, the plural handset units 1 and TAM units 1T can be discriminated from each other by utilizing their respective identifying codes HSID, and a particular handset unit 1 can be paired with a particular TAM unit 1T.

As described above, according to the present invention, the user can listen to a business message over his handset unit 1 without being physically located at the base unit or having to push the operation button of the TAM unit or a playback tape machine. Hence, the advantage of a cordless telephone system is realized even while carrying out the TAM function. The base unit 2 operates merely with one transmitting circuit 210 and one receiving circuit 220; and special transmitting and receiving circuits need not be provided in or designed for the TAM unit 1T. Thus, even if the allocation of channels is restricted by regulations, such as FCC or the like, the cordless telephone system of the present invention can be utilized without difficulty. Advantageously, the user may purchase components of the cordless telephone system in stages. For example, the TAM unit 1T may be purchased after handset unit 1 and base unit 2 have been bought.

In addition, since the TAM unit 1T is provided independently of the handset unit 1 and the base unit 2, the TAM unit may be located at any desired position or site within the service area of the base unit 2. For example, the TAM unit may be located at an unobtrusive place, such as the corner of a room or the like.

Having described preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

We claim:

1. A cordless telephone system comprising:
   a base unit having transmitting and receiving circuits and connected to a telephone line network;
   a handset unit having microphone and speaker for telephone conversation, a plurality of selectively operable keys and transmitting and receiving circuits;
   a telephone answering machine (TAM) unit having audio signal recording and reproducing apparatus and transmitting and receiving circuits; and
   control means for controlling said system in a normal communication mode such that audio signals from said microphone and to said speaker are coupled to said telephone line network through said transmitting and receiving circuits, respectively, of said handset unit and said receiving and transmitting circuits, respectively, of said base unit; said control means controlling said system in an automatic answering mode to record an audio signal from said telephone line network by said recording and reproducing apparatus through said transmitting circuit of said base unit and said receiving circuit of said TAM unit, said control means being responsive to the operation of a predetermined key of said handset unit to cause a control signal indicative of such key operation to be supplied to said recording and reproducing apparatus through said transmitting circuit of said handset unit, said receiving circuit of said base unit, said transmitting circuit of said base unit and said receiving circuit of said TAM unit to place said recording and reproducing apparatus in a reproduction mode for reproducing previously recorded audio signals from said recording and reproducing apparatus to be supplied to said speaker through said transmitting circuit of said TAM unit, said receiving circuit of said base unit, said transmitting circuit of said base unit and said receiving circuit of said handset unit.

2. The system of claim 1 wherein said handset unit includes handset processor means programmed to respond to said predetermined key to supply a reproduction request signal to the transmitting circuit in said handset unit for transmission to said base unit; said base unit includes base processor means coupled to the receiving circuit therein and responsive to reception of said reproduction request signal to supply to the transmitting circuit of said base unit a playback command signal for transmission to said TAM unit; and said TAM unit includes TAM processor means coupled to the receiving circuit in said TAM unit and responsive to reception of said playback command signal to reproduce previously recorded audio signals and to supply same to the transmitting circuit in said TAM unit.

3. The system of claim 2 further comprising a plurality of selectable communication channels for communicating between the transmitting and receiving circuits of the handset unit and the transmitting and receiving circuits of the base unit; and wherein said base processor means is programmed to supply to the transmitting circuit of said base unit an acknowledge signal for transmission to said handset unit in response to said reproduction request signal to select a communication channel between the handset and base units over which reproduced audio signals are received by said handset unit.

4. The system of claim 3 further comprising a plurality of selectable communication channels for communicating between the transmitting and receiving circuits of the base unit and the transmitting and receiving circuits of the TAM unit; and wherein said base processor means is programmed to include in said playback command signal transmitted to the TAM unit a channel select signal identifying the communication channel over which the audio signals reproduced by said TAM are transmitted to said base unit.

5. The system of claim 4 wherein the selected communication channel between the transmitting circuit in the base unit and the receiving circuit in the handset unit differs from the communication channel between the receiving circuit in the base unit and the transmitting circuit in the TAM unit.

6. The system of claim 4 wherein the handset processor means is further programmed to inhibit the transmitting circuit in said handset unit in response to reception of the acknowledge signal transmitted thereto by said base unit.

7. The system of claim 4 wherein the TAM processor means is programmed to sense when the previously recorded audio signals have been reproduced to supply to the transmitting circuit in said TAM unit a terminate signal for transmission to said base unit and to dispose said TAM unit in a standby mode.

8. The system of claim 7 wherein said base processor means is further programmed to supply to the transmitting circuit in said base unit a terminate command signal in response to the terminate signal received from said TAM unit, said terminate command signal being transmitted to said handset unit; and wherein said handset processor means is further programmed to respond to reception of said terminate command signal to dispose said handset unit in a standby mode.

* * * * *